United States Patent Office 2,744,910
Patented May 8, 1956

---

2,744,910

2-(ORTHO-BENZYLBENZYL)-IMIDAZOLINE AND ACID ADDITION SALTS

Merrill Eugene Speeter, Kalamazoo, Mich., assignor to Bristol Laboratories Inc., Syracuse, N. Y., a corporation of New York No Drawing. Application June 27, 1955, Serial No. 518,352

3 Claims. (Cl. 260—309.6)

This invention relates to a new class of organic compounds possessing therapeutic value; and more particularly, to certain imidazolines and to acid addition salts thereof.

This application is a continuation-in-part of my copending application of Serial No. 296,929, filed July 2, 1952, which in turn was a continuation-in-part of my co-pending application of Serial No. 146,927, filed February 28, 1950.

The free base of the new compound may be represented by the following general formula:

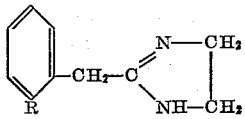

where R is benzyl.

The acid addition salts of this compound are also included within the present invention. Some examples of the non-toxic acid addition salts of the free base with inorganic or organic acids which may be prepared by the methods hereinafter described are the hydrochloride, hydrobromide, hydroiodide, sulfate, phosphate, maleate, acetate, citrate, oxalate, succinate, benzoate, tartrate, and the like.

The compounds of this invention are also useful for their ability to decrease blood pressure.

The following example will serve to illustrate the invention without limiting it thereto:

Example 2-(ortho-benzylbenzyl)-imidazoline is prepared by heating 20 grams (0.084 mole) of methyl orthobenzylphenyl acetate for thirty hours on a steam bath with 18 grams (0.3 mole) of anhydrous ethylenediamine. The mixture was heated under vacuum and when the temperature of the bath reached 200° C., vapor was given off and the vacuum fell considerably. After ten minutes the vacuum again reached 3 mm. and the temperature of the bath could be slowly raised without loss of vacuum. On distillation a main fraction boiling at 210°–280° C. The distillate solidified and the solid was thereafter dissolved in isopropanol and saturated with dry hydrogen chloride in the cold. The crystals, which formed and slowly separated, were filtered and again crystallized from isopropanol. The crystalline product melted at 172–174° C., the yield thereof being 8 grams.

Analysis.—Calculated for $C_{17}H_{18}N_2 \cdot HCl$.

|   | Calculated | Found |
|---|---|---|
| C | 71.21 | 71.30 |
| H | 6.67 | 6.71 |
| N | 9.76 | 9.99 |

I claim:

1. A compound selected from the group consisting of 2-(ortho-benzylbenzyl)-imidazoline and acid addition salts thereof.

2. The compound 2-(ortho-benzylbenzyl)-imidazoline.

3. The compound 2-(ortho-benzylbenzyl)-imidazoline hydrochloride.

No references cited.